United States Patent [19]
Paoli

[11] 3,866,707
[45] Feb. 18, 1975

[54] AIR CUSHION VEHICLE FLEXIBLE SKIRT ARRANGEMENT

[76] Inventor: Charles Paoli, Groupe Scolaire Albert Camus, Le Port Marly, France

[22] Filed: Mar. 7, 1973

[21] Appl. No.: 339,003

[30] Foreign Application Priority Data
Mar. 10, 1972  France .............................. 72.08341

[52] U.S. Cl. ................................................. 180/127
[51] Int. Cl. ............................................ B60v 1/16
[58] Field of Search ...................... 180/116, 124, 127

[56] References Cited
UNITED STATES PATENTS

| | | | |
|---|---|---|---|
| 3,253,666 | 5/1966 | Kiernan | 180/116 X |
| 3,291,237 | 12/1966 | Hopkins | 180/127 |
| 3,327,800 | 6/1967 | Huegel | 180/124 |
| 3,379,271 | 4/1968 | Hopkins | 180/127 X |
| 3,414,076 | 12/1968 | Bertin | 180/124 |
| 3,467,215 | 9/1969 | Hardy | 180/124 X |
| 3,481,424 | 12/1969 | Barr | 180/124 |
| 3,561,558 | 2/1971 | Parkhouse | 180/116 |
| 3,756,343 | 9/1973 | Joyce | 180/124 X |

FOREIGN PATENTS OR APPLICATIONS

| | | | |
|---|---|---|---|
| 1,226,551 | 3/1971 | Great Britain | 180/124 |
| 1,239,746 | 7/1971 | Great Britain | 180/124 |
| 1,236,571 | 6/1971 | Great Britain | 180/124 |
| 1,239,745 | 7/1971 | Great Britain | 180/124 |

Primary Examiner—Robert R. Song
Assistant Examiner—Terrance L. Siemens
Attorney, Agent, or Firm—Waters, Roditi, Schwartz & Nissen

[57] ABSTRACT

A skirt construction for an air cushion vehicle, comprising inner and outer skirts constituted of flexible bands of material connected together by a plurality of cables connected at a common point on the inner skirt and radiating to spaced locations along the outer skirt, to form a succession of longitudinal rolls in the outer skirt. The outer skirt is directly connected at its upper edge to a structural element of the vehicle and a flexible cable is connected to the structural element and to the common point on the inner skirt of the aforementioned cables. An elastic system can be directly coupled to the structural element and to the aforesaid common point of attachment of the cables for urging the skirts to a retracted position. At the lower edges of the skirts, they are laced together to form a gap thereat for discharge of water.

13 Claims, 6 Drawing Figures

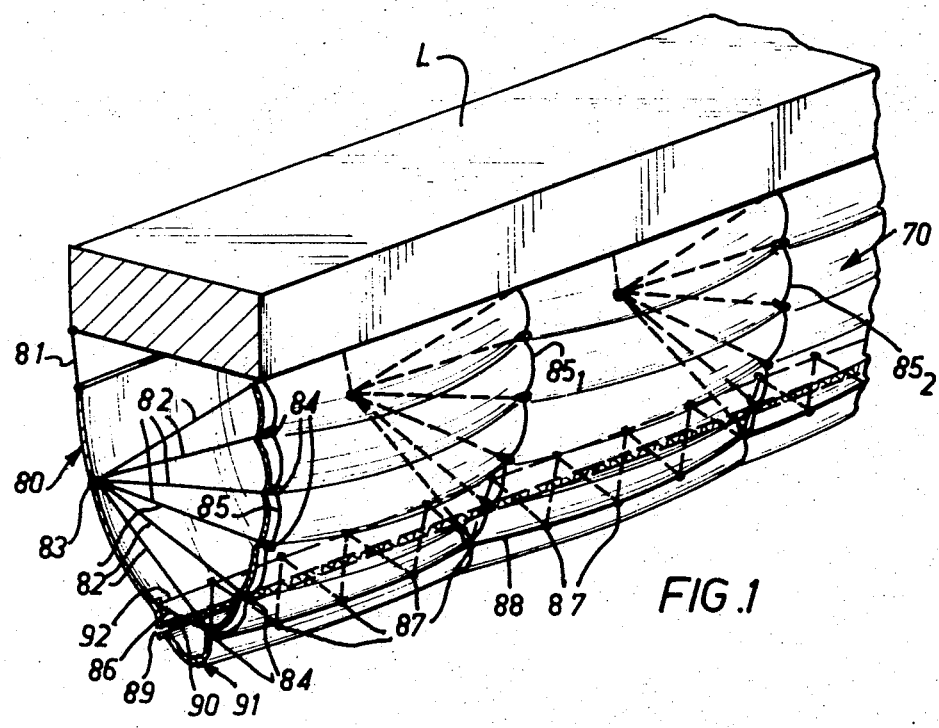
FIG.1
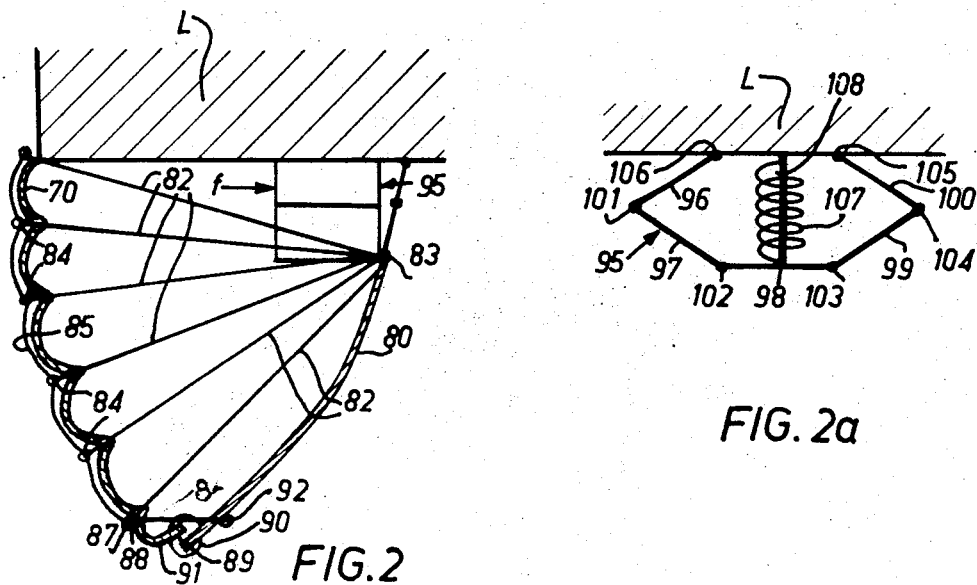
FIG.2
FIG.2a

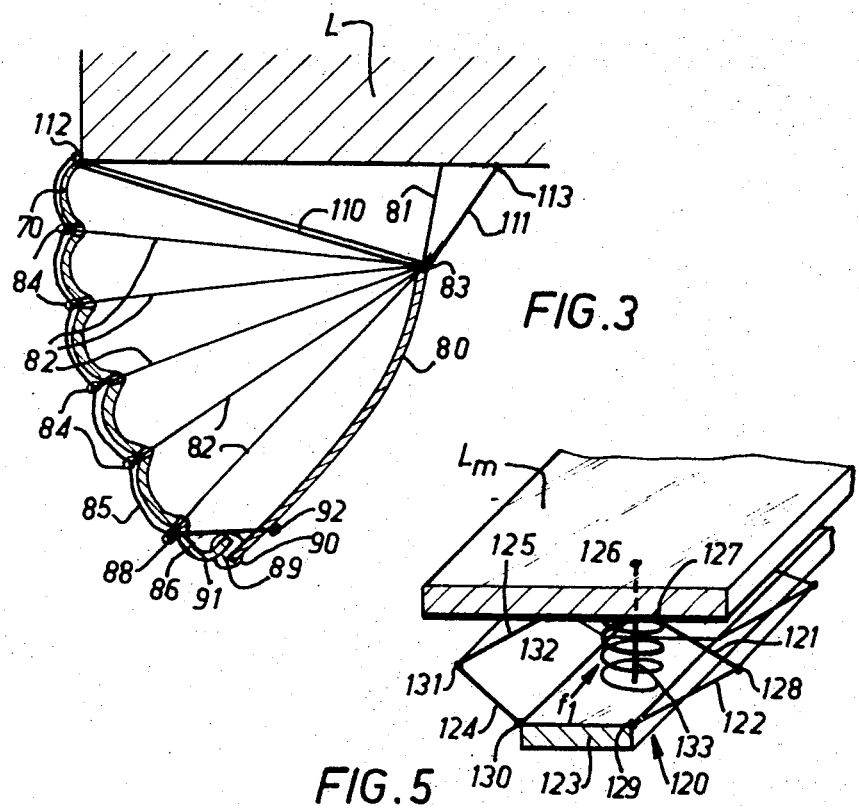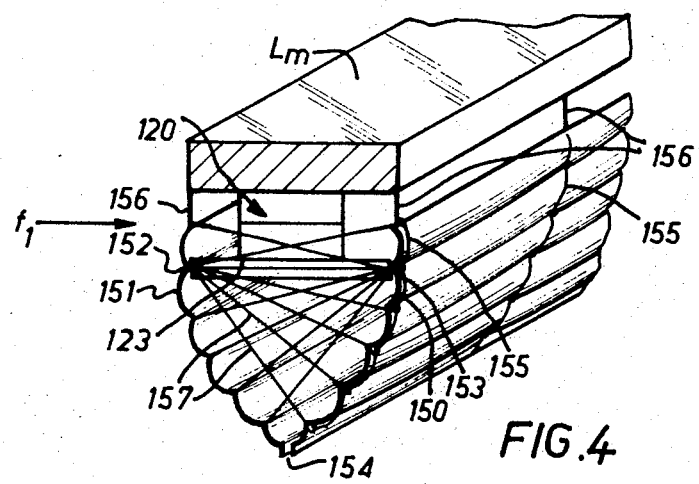

AIR CUSHION VEHICLE FLEXIBLE SKIRT ARRANGEMENT

The application relates to an air-cushion ("hovercraft") vehicle having a peripheral skirt, and additional skirts arranged longitudinally and transversely in the enclosure defined by the peripheral skirt, so that the air-cushion is sub-divided into a number of longitudinal and transverse chambers.

According to the construction in my copending Application Serial No. 235,519, these additional skirts consist of two continuous bands fixed on either side of stringers and crosspieces forming the vehicle chassis. The outer band of the peripheral skirt is fixed to a structural component, while the inner band is suspended from the structure by cables. For skirts that are arranged inside the enclosure which is defined above, the two bands are suspended on either side of the structural components by means of cables.

In these skirts, the lower limits of the bands are riveted together. Moreover these bands are assembled from place to place at the edges of cloth or fabric braces, or of the same material as the bands, the said braces being arranged transversely. The assembly edges of the transverse components take the form of arcs of a circle, corresponding to the profiles which the said bands have to show in the working position.

Moreover, flexible cables consisting of metal wires twisted together are fixed respectively from place to place, under the floor of the vehicle and to suitably selected parts of the inner band of the peripheral skirt and the two bands of the inner skirts. These cables therefore form a lattice in the space below the floor of the vehicle in the chambers bounded by the skirts.

An air-cushion vehicle fitted with skirts like those described above has a number of drawbacks:

As the skirts are assembled to braces by riveting their lower extremities, they display a certain rigidity and are therefore retracted with difficulty before an obstacle such as a wave or swell. Riveting to the lower edges does not provide sufficient openings for the evacuation of the water. The form of assembly on braces is difficult to carry out and therefore costly.

The cables forming a lattice in the space below the floor of the vehicle, on meeting an obstacle such as a wave, for instance, are subjected to considerable stresses which are transmitted to the inner bands of the peripheral skirts and to the bands of the inner skirts. These stresses can cause considerable damage to the bands to which the said cables are attached.

The invention seeks to remedy these shortcomings.

In accordance with the invention the "hovercraft" (air cushion vehicle) has skirts consisting of flexible bands, one of the latter extending parallel to the peripheral band and being associated in part, from place to place, with the latter by flexible means to constitute a composite peripheral skirt; and bands extending parallel and associated in part, from place to place, with one another by flexible means, so as to constitute inner skirts arranged longitudinally and transversely in the space bounded by the said peripheral skirt, the said skirts being secured from place to place, to the platform by suspension devices, the construction being characterized in that the said flexible devices are in the form of cables joining one band to the other, and in that the said suspension devices comprise means for returning the skirt to the raised position.

These cables for maintaining a first band start, in the form of radii, from a point of attachment situated on the other band, the said cables passing through holes made in the first band and these cables are held in position at their extremities by a connecting cable.

The lower extremities of the bands are joined by lacing so that a gap remains which creates a spout for the efficient discharge of water when the skirts are out of the water.

The peripheral bands are also provided with a second horizontal lacing between practically the extremity of the lower band and a line parallel to the lower edge of the outer band, so that a bulb is formed in the outer band, which points downwards. This bulb makes it possible to reduce the contact pressure when an obstacle is encountered.

According to a further characteristic, the means of suspension of the said skirts are formed in, section, in the shape of a hexagon, with arms jointed together, a traction spring being arranged between the lower horizontal arm and the lower surface of the platform which constitutes an upper horizontal arm of the said hexagon and to which the lateral arms are jointed.

This arrangement enables the traction spring to draw back the skirt when an obstacle is met (such as a wave, for instance), against the blowing pressure acting on the skirt. The latter is therefore protected.

Further characteristics and advantages will emerge from the following text describing a method of carrying out the invention which is given by way of example, and in conjunction with the drawings relating thereto, in which:

FIG. 1 is a view in perspective of part of the peripheral skirt according to the invention;

FIG. 2 is a view of a section of the peripheral skirt according to the invention at the point where a first method of carrying out the means of suspension is fitted; FIG. 2a is a diagram of the first form of carrying out the means of suspension seen in the direction of the arrow $f$ in FIG. 2;

FIG. 3 is a view of a section of the peripheral skirt according to the invention at the point of assembly of a second method of carrying out the means of suspension;

FIG. 4 shows in perspective a part of the inner skirts according to the invention, and FIG. 5 describes a means of suspension that can be used with the skirts of FIG. 4, seen in perspective in the direction of the arrow $f_1$ in FIG. 4.

In FIG. 1, an outer band 70 has its upper edge mounted directly on a structural component L, while the inner band 80 is suspended from an inner surface of the structural component L, for instance by means of cables 81. At a joint 83 arranged on the inner surface of the band 80 are attached a number of cables 82 (6 in the present figure), which radiate from this joint 83 to the other band 70 of the skirt.

The cables 82 pass through the band 70 at points equidistant from one another, and through holes that can be fitted with eyelets and reach the outer surface of the band 70. The cables 82 terminate in loops 84 through which is arranged a cable 85 so as to hold in place the cables 82 and the band 70. The cable 85 is fixed to its upper extremity to the component L. The flexible means thus formed are arranged at determined distances from one another along the periphery of the bands with the cables $85_1$, $85_2$ etc so as to form a composite skirt with longitudinal roll-like sections or bulbs therein as evident from FIG. 2. In the lower part of the skirt thus formed, there is horizontal lacing between the band 70 and the band 80 by means of a cable 86 which traverses the bands through holes 87 made at the point where the direction of lacing is reversed. Cables 82 and 92 are provided on the outer surfaces of the bands 70 and 80 respectively, to keep that lacing in position. In this way a bulb 91 is formed and it points downwards. As has already been mentioned above, this bulb makes it possible to lessen the contact pressure between the skirt and a possible obstacle. The two lower extremities of the bands 70 and 80 are arranged so as to form a gap 89 whose edges are kept in position by lacing 90. Means of suspension 95 are provided from place to place along the skirt. As shown in FIG. 2, these suspension means are fixed on the one hand to the structure of the vehicle and on the other to the skirt, and preferably to the inner surface of the band 80. The purpose of these means of suspension is constantly to return the skirts to a folded position against the blowing pressure exerted on the skirts. According to a first form of execution, this return movement can be affected by the action of a traction spring 107 arranged between a lower arm 98 and the structure L. A cable 108 can be arranged between the point of attachment to the structural component L of the spring 107 and the point of attachment of the said spring to the lower arm 98 of the means of suspension 95. The cable 108 serves to limit the expansion path of the skirt to keep it at its point of balance. In section, the means of suspension 95 has the general form of a hexagon whose arms 96 and 100 are articulated at 106 and 105 to the structure L, and at 101 and 104 to the arms 97 and 99 which are themselves articulated to the arm 98 and 102 at 103. According to another form of carrying out the means of suspension, this may consist as shown in FIG. 3 of a bar 110 articulated on the one hand at 83 to the inner surface of the band 80 and at 112 to the structure L, and an elastic cable 111 joined to the said bar 110 at 83 and at a point 113 of the structure situated towards the interior of the vehicle in relation to the band 80. The operation of this second means of suspension is based on the fact that the resultant of the blowing force is directed in normal service very largely parallel to the structural component towards the outside of the skirt, but on meeting an obstacle it is directed upwards at an angle with the structure which varies with the angle of lift of the skirt, i.e., with the extent of the obstacle encountered. It is the vertical component of this resultant which acts as the return force of the skirt, the bar 110 acting as guide bar (FIG. 3).

As shown in FIG. 4, in a similar way to the peripheral skirt, the inner skirts consist of two bands 150 and 151 suspended by cables 156 to a component Lm of the structure of the vehicle. Cables 157 are articulated at 153 to the bands 150 and 151, radiating to the opposite band, traversing it via holes therein and held in place by cables 155. Thus the bands and the system of cables constitutes a composite skirt. The lower extremities of the bands 150 and 151 are left open so as to form a gap 154 which, as in the case of the peripheral skirt, serves to discharge water which might have found its way inside the skirt. A means of suspension 120, as shown in FIG. 5, is arranged from place to place along the skirt to constantly return the skirt towards a folded position. These means of suspension 120 display a shape that is generally hexagonal in section. They are fixed between the two bands of the skirt on the structural component Lm on the one hand and on the other hand by a plate 123 to the articulations 152 and 153. Arms 122 and 124 are connected to plate 123 at articulations 129 and 130 and to arms 121 and 125 by articulations 128 and 131. A traction spring 132 is arranged between the component Lm of the structure and the plate 123. A cable 133 can be arranged to limit the vertical movement of the suspension means.

Many improvements are modifications can be made without thereby departing from the scope of the invention.

I claim:

1. A skirt connection for an air cushion vehicle comprising juxtaposed inner and outer skirts extending longitudinally and constituted of flexible bands of material, a plurality of transverse connection means between the inner and outer skirts at longitudinally spaced locations therealong, each connection means comprising a plurality of cables connected at a common point to the inner skirt and having remote ends coupled to the outer skirt at spaced locations thereon to form a succession of longitudinal rolls along the outer skirt, the vehicle having a structural element, said outer skirt having an upper edge directly connected to said structural element, and means including a further flexible cable connecting each said common point of each transverse connection means to said structural element.

2. The construction as claimed in claim 1 comprising elastic means directly coupled to said structural element and to said common point of attachment of the cables for urging the skirts to a retracted folded position.

3. The construction as claimed in claim 2 wherein said skirts have spaced lower edges and means connecting said lower edges to provide a gap thereat.

4. The construction as claimed in claim 3 wherein said means connecting the lower edges comprises a lacing.

5. The construction as claimed in claim 3 wherein said gap faces downwardly to allow water between the skirts to be discharged.

6. The construction as claimed in claim 2 wherein said cables traverse the outer skirt through holes provided therein, and a connecting cable is provided to hold the cables at said remote ends thereof.

7. The construction as claimed in claim 2 wherein said elastic means comprises a plurality of arms pivotally connected together and to said structural element to form a polygon therewith, and a traction spring connected to one of the arms and to said structural element.

8. The construction as claimed in claim 7 wherein said one arm extends parallel to said structural element.

9. The construction as claimed in claim 8 wherein said polygon is a hexagon.

10. The construction as claimed in claim 7 comprising a cable connecting said one arm and said structural element to limit maximum displacement therebetween.

11. The construction as claimed in claim 2 wherein said elastic means comprises a bar having one end connected to said point of attachment of the cables and a second end connected to said structural element at the location where the upper edge of the outer skirt is connected thereto, and an elastic cable connected to said bar and to said structural element at a location spaced from the location at which the flexible cable is connected to said structural element.

12. The construction as claimed in claim 11 wherein the point of connection of said elastic cable to the structural element is more distant from the connection of the upper edge of the outer skirt than the point of connection of the flexible cable to the structural element.

13. The construction as claimed in claim 1 comprising further cables directly connecting said upper edge of the outer skirt to said structural element, and elastic means directly coupled to said structural element and to both said skirts for urging the skirts to a retracted folded position, said elastic means being connected to said inner skirt at said common point of attachment of the cables.

* * * * *